US012492308B2

(12) United States Patent
Guillamot et al.

(10) Patent No.: US 12,492,308 B2
(45) Date of Patent: Dec. 9, 2025

(54) MULTICOMPONENT THERMOPLASTIC PRODUCT

(71) Applicant: CARBIOS, Clermont-Ferrand (FR)

(72) Inventors: Frédérique Guillamot, Gerzat (FR); Madiha Aloui Dalibey, Clermont-Ferrand (FR)

(73) Assignee: CARBIOS

( * ) Notice: Subject to any disclaimer, the term of this patent is extended or adjusted under 35 U.S.C. 154(b) by 733 days.

(21) Appl. No.: 17/598,336

(22) PCT Filed: Mar. 27, 2020

(86) PCT No.: PCT/EP2020/058831
§ 371 (c)(1),
(2) Date: Sep. 27, 2021

(87) PCT Pub. No.: WO2020/193781
PCT Pub. Date: Oct. 1, 2020

(65) Prior Publication Data
US 2022/0177697 A1 Jun. 9, 2022

(30) Foreign Application Priority Data

Mar. 28, 2019 (EP) ..................... 19305396

(51) Int. Cl.
| | | |
|---|---|---|
| *C08L 67/04* | (2006.01) | |
| *B29C 48/00* | (2019.01) | |
| *B29C 48/05* | (2019.01) | |
| *B29C 48/21* | (2019.01) | |
| *B29K 101/12* | (2006.01) | |
| *C08J 3/00* | (2006.01) | |
| *C08J 5/18* | (2006.01) | |
| *C08L 67/02* | (2006.01) | |
| *C09D 7/65* | (2018.01) | |
| *C09D 167/02* | (2006.01) | |
| *D01F 1/10* | (2006.01) | |
| *D01F 8/14* | (2006.01) | |

(52) U.S. Cl.
CPC ............ *C08L 67/04* (2013.01); *B29C 48/022* (2019.02); *B29C 48/05* (2019.02); *B29C 48/21* (2019.02); *C08J 3/005* (2013.01); *C08J 5/18* (2013.01); *C08L 67/02* (2013.01); *C09D 7/65* (2018.01); *C09D 167/02* (2013.01); *D01F 1/10* (2013.01); *D01F 8/14* (2013.01); *B29K 2101/12* (2013.01); *C08J 2367/02* (2013.01); *C08J 2367/04* (2013.01); *C08J 2489/00* (2013.01); *C08L 2201/06* (2013.01); *C08L 2203/10* (2013.01); *C08L 2203/12* (2013.01); *C08L 2203/16* (2013.01)

(58) Field of Classification Search
CPC ...... C08L 67/04; C08L 67/02; C08L 2201/06; C08L 2203/10; C08L 2203/12; C08L 2203/16; B29C 48/022; B29C 48/05; B29C 48/21; C08J 3/005; C08J 5/18; C08J 2367/02; C08J 2367/04; C08J 2489/00; C09D 7/65; C09D 167/02; D01F 1/10; D01F 8/14; D01F 8/04; B29K 2101/12; B29B 7/726; B29B 7/826; B29B 9/16; B29B 7/48; B29B 9/06; B29B 9/12; Y02W 30/62; B32B 27/285; B32B 27/306; B32B 27/32; B32B 27/34; B32B 27/36; B32B 27/40; B32B 7/027; B32B 2307/716; B32B 27/08; B32B 27/18; B33Y 70/00; D01D 5/08; D01D 5/32; D01D 5/34

See application file for complete search history.

(56) References Cited

U.S. PATENT DOCUMENTS

| | | |
|---|---|---|
| 8,470,231 B1 | 6/2013 | Dikovsky et al. |
| 10,124,512 B2 | 11/2018 | Boisart et al. |
| 10,287,561 B2 | 5/2019 | Alvarez et al. |
| 10,385,183 B2 | 8/2019 | Maille |
| 10,508,269 B2 | 12/2019 | Li et al. |
| 10,584,320 B2 | 3/2020 | Topham et al. |
| 10,590,401 B2 | 3/2020 | Tournier et al. |
| 10,626,242 B2 | 4/2020 | Ferreira et al. |
| 10,717,996 B2 | 7/2020 | Dusseaux et al. |
| 10,723,848 B2 | 7/2020 | Chateau et al. |
| 10,767,026 B2 | 9/2020 | Desrousseaux et al. |
| 10,829,598 B2 | 11/2020 | Ferreira et al. |
| 10,829,754 B2 | 11/2020 | Marty et al. |
| 11,072,784 B2 | 7/2021 | Tournier et al. |
| 11,198,767 B2 | 12/2021 | Guemard et al. |
| 11,345,906 B2 | 5/2022 | Marty et al. |

(Continued)

FOREIGN PATENT DOCUMENTS

| | | |
|---|---|---|
| WO | WO 2006/079779 | 8/2006 |
| WO | WO 2013/056833 | 4/2013 |

(Continued)

OTHER PUBLICATIONS

Written Opinion in International Application No. PCT/EP2020/058831, Jun. 9, 2020, pp. 1-8.

(Continued)

*Primary Examiner* — Mark Eashoo
*Assistant Examiner* — Cullen L G Davidson
(74) *Attorney, Agent, or Firm* — SALIWANCHIK, LLOYD & EISENSCHENK

(57) ABSTRACT

The present invention relates to a multicomponent plastic product comprising at least two different thermoplastic materials, wherein a first thermoplastic material comprises a first thermoplastic polymer, and a second thermoplastic material comprises at least a second thermoplastic polymer and at least one degrading enzyme able to degrade the first thermoplastic polymer. The second thermoplastic material has a transformation temperature lower than the transformation temperature of the first thermoplastic material, and the first and second plastic materials are at least partially adjacent in the multicomponent product.

20 Claims, No Drawings

(56) References Cited

U.S. PATENT DOCUMENTS

| | | |
|---|---|---|
| 11,377,533 B2 | 7/2022 | Desrousseaux et al. |
| 11,384,218 B2 | 7/2022 | Guemard et al. |
| 11,414,651 B2 | 8/2022 | Topham et al. |
| 11,535,832 B2 | 12/2022 | David et al. |
| 11,549,105 B2 | 1/2023 | Marty et al. |
| 11,692,181 B2 | 7/2023 | Andre et al. |
| 11,802,185 B2 | 10/2023 | Chateau et al. |
| 11,851,689 B2 | 12/2023 | Duquesne et al. |
| 11,926,851 B2 | 3/2024 | David et al. |
| 2009/0148492 A1* | 6/2009 | Dave .................. A61L 31/148 424/423 |
| 2017/0259976 A1* | 9/2017 | Lee .................. B65D 65/46 |
| 2020/0190279 A1 | 6/2020 | Guemard et al. |
| 2022/0002516 A1 | 1/2022 | Chateau |
| 2022/0177697 A1 | 6/2022 | Guillamot et al. |
| 2022/0184214 A1 | 6/2022 | Guillamot et al. |
| 2022/0227957 A1 | 7/2022 | Guemard et al. |
| 2022/0251327 A1 | 8/2022 | Marty et al. |
| 2022/0282232 A1 | 9/2022 | Tournier |
| 2022/0282235 A1 | 9/2022 | Duquesne et al. |
| 2022/0363861 A1 | 11/2022 | Marty |
| 2023/0034354 A1 | 2/2023 | Chateau |
| 2023/0048275 A1 | 2/2023 | Marty |
| 2023/0049607 A1 | 2/2023 | Aloui Dalibey et al. |
| 2023/0135014 A1 | 5/2023 | Topham et al. |
| 2023/0392129 A1 | 12/2023 | Tournier |
| 2023/0392130 A1 | 12/2023 | Tournier |
| 2023/0399628 A1 | 12/2023 | Tournier |
| 2023/0399629 A1 | 12/2023 | Tournier |
| 2024/0052114 A1 | 2/2024 | Chateau et al. |
| 2024/0059859 A1 | 2/2024 | Bouchiba et al. |

FOREIGN PATENT DOCUMENTS

| | | |
|---|---|---|
| WO | WO 2016/054528 | 4/2016 |
| WO | WO 2019/043145 | 3/2019 |
| WO | WO 2020/193779 | 10/2020 |
| WO | WO 2022/243545 | 11/2022 |
| WO | WO 2022/243547 | 11/2022 |
| WO | WO 2023/088908 | 5/2023 |
| WO | WO 2023/088909 | 5/2023 |
| WO | WO 2023/088910 | 5/2023 |

OTHER PUBLICATIONS

Claims as filed in U.S. Appl. No. 18/560,943, filed Nov. 15, 2023, pp. 1-6.

Claims as filed in U.S. Appl. No. 18/560,951, filed Nov. 15, 2023, pp. 1-3.

Claims as filed in U.S. Appl. No. 18/621,330, filed Mar. 29, 2024, pp. 1-4.

Claims as filed in U.S. Appl. No. 18/710,658, filed May 16, 2024, p. 1.

Claims as filed in U.S. Appl. No. 18/710,735, filed May 16, 2024, p. 1.

Claims as filed in U.S. Appl. No. 18/710,760, filed May 16, 2024, p. 1.

* cited by examiner

MULTICOMPONENT THERMOPLASTIC PRODUCT

CROSS-REFERENCE TO RELATED APPLICATION

This application is the U.S. national stage application of International Patent Application No. PCT/EP2020/058831, filed Mar. 27, 2020.

The present invention relates to multicomponent thermoplastic products. More particularly, the present invention relates to multicomponent products comprising at least two distinct polymeric regions, wherein one of these polymeric regions contains a degrading enzyme suitable for degrading at least one polymer of another polymeric region. The present invention also relates to a process for manufacturing multicomponent plastic products.

BACKGROUND

Plastics are inexpensive and durable materials, which can be used to manufacture a variety of products that find use in a wide range of applications, so that the production of plastics has increased dramatically over the last decades.

Multicomponent plastic products, such as multicomponent filaments and multilayer plastics, are often used for combining properties of polymers (i.e., high thermal stability, chemical inertness, density, elasticity, etc.). For instance, for certain beverage packaging, such as beer bottles or sparkling water, PET sandwiches a polyvinyl alcohol (PVOH) layer or a polyamide layer to reduce the gas permeability of the packaging. Similarly, some rigid food packaging, such as food trays contain a layer of polyethylene (PE) as a welding agent between the tray and the lid both constituted of PET.

More than 50% of these plastics are used for single-use disposable applications, such as packaging, agricultural films, disposable consumer items or for short-lived products that are discarded within a year of manufacture. Because of the durability of the polymers involved, substantial quantities of plastics are piling up in landfill sites and in natural habitats worldwide, generating increasing environmental problems. Even degradable and biodegradable plastics may persist for decades depending on local environmental factors, like levels of ultraviolet light exposure, humidity, temperature, presence of suitable microorganisms, etc.

To answer these problems, different physical, chemical and/or biochemical approaches have been developed to increase the biodegradation rate of polymers, and biodegradable plastic products have been developed. However, the environmental degradation conditions are not optimal for such biodegradable plastics and their degradation generally takes place partially.

Recently, a novel plastic material has been developed that contains a small amount of biological entities having a polymer-degrading activity as described in WO 2013/093355 WO2016/198652 and WO2016/198650. The biological entities are interestingly able to degrade at least one polymer of said plastic material and are dispersed in the plastic material. Such resulting plastic material is directly usable through an extrusion die for producing plastic articles having improved biodegradability.

SUMMARY OF THE INVENTION

By working on plastic material and enzymes to be incorporated therein to favor polymer degradation, the inventors have developed new plastic products that comprise two or more distinct plastic materials, composed of different thermoplastic polymers. A first plastic material is free of degrading enzyme, whereas a second plastic material comprises a degrading enzyme able to degrade a thermoplastic polymer of the first plastic material. According to the invention, the two or more plastic materials are at least partially adjacent and are not intimately mixed. Indeed, the inventors have surprisingly discovered that the physical contact between two adjacent regions allows a degrading enzyme present within one of the regions to degrade a thermoplastic polymer within the adjacent region and eventually to spread in this region. The degrading enzyme is thereby in contact with the first polymer whose degradation thus occurs. The inventors have also developed a process for manufacturing such multicomponent plastics. Interestingly, the inventors propose to introduce the degrading enzyme within a thermoplastic material with a transformation temperature below the transformation temperature of the thermoplastic material comprising the polymer targeted by the degrading enzyme, particularly at least 50° C. below. Accordingly, with the process of the invention, it is possible to produce a thermoplastic product comprising a thermoplastic polymer with a high transformation temperature and a degrading enzyme able to degrade said thermoplastic polymer, wherein the enzyme still exhibits a degrading activity in the thermoplastic product, efficient enough to allow the at least partial degradation of the plastic product.

In this regard, it is an object of the invention to provide a multicomponent product comprising at least two different thermoplastic materials, wherein
 a first thermoplastic material comprises a first thermoplastic polymer, and
 a second thermoplastic material comprises at least a second thermoplastic polymer and at least one degrading enzyme able to degrade the first thermoplastic polymer,
wherein the second thermoplastic material has a transformation temperature (Tf) lower than the transformation temperature (Tf) of the first thermoplastic material and wherein the first and second plastic materials are at least partially adjacent in the multicomponent product.

According to the invention, the degrading enzyme is able to degrade the first thermoplastic polymer in the multicomponent plastic product.

Advantageously, the multicomponent product is selected from multicomponent filaments and multilayer plastic products, including multilayer plastic films, multilayer plastic sheets, multilayer plastic trays, multilayer plastic bottles, multilayer packaging, multilayer profiles and tubes.

Advantageously, the heat treatment, or transformation process or processing step, used for manufacturing the multicomponent product is coextrusion, coinjection or extrusion coating, preferably coextrusion.

In a particular embodiment, the first thermoplastic polymer is PLA and the second thermoplastic polymer is PCL.

In another particular embodiment, the first thermoplastic polymer is PET and the second thermoplastic polymer is PCL.

It is a further object of the invention to provide a process for manufacturing a multicomponent product according to the invention, comprising the steps consisting on
 a. selecting a first thermoplastic material comprising a first thermoplastic polymer;
 b. selecting a degrading enzyme able to degrade said first thermoplastic polymer;

c. mixing the degrading enzyme with a second thermoplastic polymer at a temperature at which said second thermoplastic polymer is in a partially or totally molten state, to obtain a second thermoplastic material, wherein the second thermoplastic material has a transformation temperature (Tf) lower than the transformation temperature (Tf) of the first thermoplastic material;

d. coextruding or coinjecting or extruding coating said thermoplastic materials to obtain a multicomponent product.

These and the other objects and embodiments of the invention will become more apparent after the detailed description of the invention, including preferred embodiments thereof given in general terms.

DETAILED INVENTION

Definitions

The present disclosure will be best understood by reference to the following definitions.

A "thermoplastic material" refers to a composition under solid or molten state, comprising one or more thermoplastic polymers and optionally additional substances or additives, such as plasticizers, mineral or organic fillers, before any shaping or conditioning step. Preferably, a thermoplastic material comprises a mix of semi-crystalline and/or amorphous polymers, or semi-crystalline polymers. In particular embodiments, a thermoplastic material comprises only amorphous thermoplastic polymers (and optionally enzymes and/or additives). According to the invention, thermoplastic material is used for manufacturing plastic products or textiles.

Within the context of the invention, the term "multicomponent plastic product" or "multicomponent thermoplastic product" refers to any item or product (such as plastic sheet, film, tube, rod, profile, shape, massive block, fiber, filament, yarn, etc.) comprising different regions or parts physically distinct, some of them being adjacent, that comprise different thermoplastic polymers. In the context of the invention, multicomponent plastic product encompasses all kind of plastic products composed of at least two thermoplastic materials, arranged relative to each other in such a way that they are not intimately mixed. For instance, some regions of the multicomponent plastic product may adhere to each other or be bonded naturally due to plastic material compatibility or by use of additives between the two regions. Particularly, the multicomponent plastic product is a manufactured product, such as a rigid or flexible packaging, agricultural films, bags, filaments, textile, nonwoven, disposable items or the like.

A "polymer" refers to a chemical compound or mixture of compounds whose structure is constituted of multiple repeating units linked by covalent chemical bonds. A "thermoplastic polymer" refers to a polymer that becomes moldable above a specific temperature and solidifies upon cooling. Most often, a thermoplastic polymer is at least moldable at its melting temperature (Tm) and/or above. Some thermoplastic polymers begin to be moldable at their glass temperature (Tg). Such temperatures may be estimated by different analytical methods. For instance, Differential Scanning calorimetry (DSC) or Differential thermal analysis (DTA) may be used for determining the Tg and Tm of polymers. Within the context of the invention, the term thermoplastic polymer includes synthetic thermoplastic polymers, constituted of a single type of repeat unit (i.e., homopolymers) or of a mixture of different repeat units (i.e., copolymers). Synthetic thermoplastic polymers include thermoplastic polymers derived from petroleum oil or from bio-based materials, such as polyolefins, aliphatic or aromatic polyesters, polyamides, polyurethanes and vinyl polymers.

According to the invention, the term "transformation temperature" (Tf) corresponds to the temperature at which a thermoplastic material is in a partially or totally molten state, i.e. the temperature at which a thermoplastic material is fluid enough to be processed by extrusion or any heat treatment. A "transformation temperature" is also called "processing temperature" and is easily determined by the skilled artisan, taking account of the process of manufacturing (i.e. the transformation process) and/or of the components of the thermoplastic material, notably of the Tf of the thermoplastic polymers contained in said thermoplastic material (said Tf being provided in technical datasheet of the thermoplastic polymers) and/or the Tf of other thermoplastic material that will be coextruded and/or coinjected with said thermoplastic material (e.g., in order to obtain close viscosities for both coextruded and/or coinjected thermoplastic materials when arriving in the common die). As an example, the transformation temperature of thermoplastic material comprising mainly semi-crystalline polymers is generally a temperature close to or above the melting temperature (Tm) of said polymers, preferably above the Tm of said polymers. Regarding thermoplastic material comprising mainly amorphous polymers, the transformation temperature refers to the temperature at which the thermoplastic material is fluid enough to be processed by extrusion or any heat treatment (i.e., in a rubbery or softened state), i.e. also called "softening temperature". Such temperature is generally higher than the glass transition temperature (Tg) of such amorphous polymer. When a thermoplastic material comprises more than one thermoplastic polymer, with different Tm (or softening temperature), the transformation temperature of the thermoplastic material is a temperature close to or above the Tm (or softening temperature) of the majority thermoplastic polymer. Alternatively, the transformation temperature of the thermoplastic material is a temperature close to or above the highest Tm (or highest softening temperature).

In particular embodiments, the transformation temperature of a thermoplastic material can be modulated (i.e., increased or decreased as compared to the Tf of the thermoplastic polymers of the thermoplastic material per se) by addition of additive(s) able to impact the polymer's fluidity.

As used herein, the term "degrading enzyme" refers to an enzyme having a polymer degrading activity. In the context of the invention, "degrading enzyme" may refer to pure enzymes or to formulations containing enzyme(s) and diluent(s) and/or carrier(s), such as stabilizing component(s) and/or solubilizing component(s), including water, glycerol, sorbitol, dextrin, (e.g., maltodextrin and/or cyclodextrin), starch, arabic gum, glycol (e.g., propanediol or mono ethylene glycol), salt, etc. The degrading enzyme may be in solid (e.g., powder) or liquid form.

As used herein, the terms "lower" or "below" a given temperature should be understood as "strictly lower" and "strictly below" respectively, i.e., said given temperature is not included.

As used herein, the term "by weight" means "based on the total weight" of the considered composition or product.

In the context of the invention, the term "about" refers to a margin of +/−5%, preferably of +/−1%, or within the tolerance of a suitable measuring device or instrument.

Plastic Materials

The present invention proposes to use at least two distinct thermoplastic materials, each comprising a thermoplastic polymer, to produce a plastic product that comprises at least two distinct parts, i.e. a multicomponent product. The distinct parts or regions are not melted within the plastic product but are maintained physically separated even if directly adjacent.

According to the invention, each plastic material comprises a thermoplastic polymer and one of them further comprises a degrading enzyme able to degrade the thermoplastic polymer of another plastic material. The thermoplastic material comprising the degrading enzyme (herein after "the second thermoplastic material") has a transformation temperature strictly below the transformation temperature of the thermoplastic material whose polymer has to be degraded by the degrading enzyme (herein after "the first thermoplastic material").

In a particular embodiment, the second thermoplastic material has a transformation temperature at least 50° C. below the transformation temperature of the first thermoplastic material, preferably 60° C., 70° C., 80° C. below.

In a particular embodiment, both thermoplastic materials comprise at least 70%, 75%, 80%, 85%, 90%, preferably at least 95% by weight of semi-crystalline thermoplastic polymers, based on the total weight of polymers within the thermoplastic materials, and said semi-crystalline thermoplastic polymer of the second material has a melting temperature (Tm) strictly below the melting temperature (Tm) of said semi-crystalline thermoplastic polymer within the first thermoplastic material. Preferably, the semi-crystalline thermoplastic polymer of the second thermoplastic material has a Tm at least 50° C. below the Tm of the semi-crystalline thermoplastic polymer of the first thermoplastic material, more preferably 60° C., 70° C., 80° C. below.

In a particular embodiment, both thermoplastic materials comprise at least 70%, 75%, 80%, 85%, 90%, preferably at least 95% by weight of amorphous polymers, based on the total weight of polymers within the thermoplastic materials, and the amorphous thermoplastic polymer of the second material has a softening temperature strictly below the softening temperature of the amorphous thermoplastic polymer within the first thermoplastic material. Preferably, the amorphous thermoplastic polymer of the second thermoplastic material has a softening temperature at least 50° C. below the softening temperature of the amorphous thermoplastic polymer of the first thermoplastic material, more preferably 60° C., 70° C., 80° C. below.

In a particular embodiment, both thermoplastic materials comprise a mix of amorphous and semi-crystalline polymers, and the polymer of the second material has a transformation temperature strictly below the transformation temperature of the polymer within the first thermoplastic material, preferably at least 50° C. below, more preferably 60° C., 70° C., 80° C. below.

It is therefore an object of the present invention to provide a multicomponent plastic product comprising at least two different thermoplastic materials, wherein
- a first thermoplastic material comprises at least 70%, 75%, 80%, 85%, 90%, preferably at least 95% by weight of a first semi-crystalline thermoplastic polymer, based on the total weight of the first thermoplastic material, and
- a second thermoplastic material comprises at least 70%, 75%, 80%, 85%, 90%, preferably at least 95% by weight of a second semi-crystalline thermoplastic polymer, based on the total weight of the second thermoplastic material, and at least one degrading enzyme able to degrade said first semi-crystalline thermoplastic polymer, wherein the second semi-crystalline thermoplastic polymer has a melting temperature (Tm) below the melting temperature (Tm) of the first semi-crystalline thermoplastic polymer, and wherein the first and second thermoplastic plastic materials are at least partially adjacent in the multicomponent product.

In a particular embodiment, the second semi-crystalline thermoplastic polymer has a Tm at least 50° C. below the Tm of the first semi-crystalline thermoplastic polymer, preferably 60° C., 70° C., 80° C. below.

In a preferred embodiment, the thermoplastic polymers used for the two plastic materials are different from each other. For instance, the polymer of the first thermoplastic material is PLA and the polymer of the second thermoplastic material is selected from PCL, PBS, PBSA or PBAT, preferably from PCL. In another particular embodiment, the polymer of the first thermoplastic material is PET and the polymer of the second thermoplastic material is selected from PCL, PBAT, PBSA, PBS, PBA, PGA, PLA, PLGA, PHA and copolymers thereof. In another embodiment, the polymer of the first thermoplastic material is PET and the polymer of the second thermoplastic material is selected from PET copolymers.

In another particular embodiment, the polymers of the thermoplastic materials are selected from polymers of same type (i.e., with same chemical formula) and with different grades, having different transformation temperatures and/or different melting temperatures. As well known by the skilled artisan, the grade of a polymer is defined according to the polymer's molecular mass, isomer rate, ramification, etc. The final plastic product will thus be made of a single type of polymers, exhibiting different grades. For instance, the thermoplastic polymers are both PLA, wherein the first thermoplastic material comprises 4043D PLA grade from NatureWorks and the second thermoplastic material comprises PLA Luminy LX930 from Total Corbion.

In another particular embodiment, the polymers of the thermoplastic plastic materials are selected from polymers of same type and same grade but the second thermoplastic material further comprises components (e.g., plasticizers, fillers, or additional polymers) able to decrease the viscosity of said polymer, leading to a decrease in Tf of the second thermoplastic material as compared to the Tf of the first plastic material. For instance, the thermoplastic polymers are both selected from the same grade of PLA, such as 4043D PLA grade from NatureWorks, but the second thermoplastic material further comprises a plasticizer so that its viscosity is decreased as compared to the viscosity of the first thermoplastic material. Such decrease of viscosity of the thermoplastic material leads to a decrease of its Tf as compared to the Tf of the thermoplastic material with higher viscosity.

In another embodiment, additives may be added to one or both thermoplastic materials in order to decrease the viscosities difference between both thermoplastic materials. Such adjustment may be obtained by addition of plasticizers, fillers, polymer(s) with higher or lower viscosity or any means known by the person skilled in the art to modify the viscosity of a polymer (including a different grade of the same polymer comprised in the thermoplastic material). Such addition may be performed during the production of each thermoplastic materials or directly during the step of production of the multicomponent plastic product.

First Thermoplastic Material

According to the invention, the first plastic material comprises a first thermoplastic polymer, and optionally additives or fillers. Preferably, the first plastic material comprises at least 70%, 75%, 80%, 85%, 90%, 95%, 99% by weight of a first thermoplastic polymer, based on the total weight of the first plastic material. In a particular embodiment, the first plastic material comprises 100% wt of a first thermoplastic polymer. In another embodiment, the first plastic material comprises two or more thermoplastic polymers, and the first thermoplastic polymer (targeted by the degrading enzyme within the second plastic material) represents 70%, 75%, 80%, 85%, 90%, 95% by weight of the first thermoplastic material. In a particular embodiment, said first thermoplastic polymer is a mix of polymers of same type (i.e., with same chemical formula) but with different grades.

Advantageously, the first thermoplastic material has a transformation temperature (Tf) above 120° C., preferably above 150° C., more preferably above 180° C. Particularly, the first thermoplastic material comprises at least 70%, 75%, 80%, 85%, 90%, preferably at least 95% by weight of a first semi-crystalline thermoplastic polymer, based on the total weight of the first thermoplastic material, said semi-crystalline thermoplastic polymer having a melting temperature (Tm) above 120° C., preferably above 150° C., more preferably above 180° C.

Preferably, the first thermoplastic polymer is selected from water-insoluble polymers.

Preferably, the first thermoplastic polymer is selected from polyolefins, aliphatic and semi-aromatic polyesters, polyamides, polyurethanes, vinyl polymers, polyethers or ester-ether copolymers and derivatives thereof, preferably from aliphatic and semi-aromatic polyesters.

Preferred polyolefins for use in the present invention include, without limitation, polyethylene (PE), polypropylene (PP), polymethylpentene (PMP), polybutene-1 (PB-1), polyisobutylene (PIB), cyclic olefin copolymer (COC) and derivatives or blends/mixtures thereof.

Preferred aliphatic polyesters for use in the invention include, without limitation, polylactic acid (PLA), poly(L-lactic acid) (PLLA), poly(D-lactic acid) (PDLA), poly(D,L-lactic acid) (PDLLA), PLA stereocomplex (scPLA), polyglycolic acid (PGA), polyhydroxyalkanoate (PHA), polycaprolactone (PCL), polybutylene succinate (PBS); and semi-aromatic polyesters are selected from polyethylene terephthalate (PET), polytrimethylene terephthalate (PTT), polybutylene terephthalate (PBT), polyethylene isosorbide terephthalate (PEIT), polybutylene succinate adipate (PBSA), polybutylene adipate terephthalate (PBAT), polybutylene adipate (PBA), polyethylene furanoate (PEF), poly(ethylene adipate) (PEA), polyethylene naphthalate (PEN), and copolymers thereof such as poly(lactic-co-glycolic acid) copolymers (PLGA) and derivatives or blends/mixtures thereof. The polyethers may be selected e.g., from polyethylene glycol (PEG), preferably PEG with molecular mass above 600 g/mol, polyethylene oxide (PEO), or copolymers and blends/mixtures thereof. The ester-ether copolymers may be selected e.g., from polydioxanone (PDS).

Preferred polyamide polymers (also called nylon) for use in the invention include without limitation, polyamide-6 or poly(β-caprolactam) or polycaproamide (PA6), polyamide-6,6 or poly(hexamethylene adipamide) (PA6,6), poly(11-aminoundecanoamide) (PA11), polydodecanolactam (PA12), poly(tetramethylene adipamide) (PA4,6), poly(pentamethylene sebacamide) (PA5,10), poly(hexamethylene azelaamide) (PA6,9), poly(hexamethylene sebacamide) (PA6,10), poly(hexamethylene dodecanoamide) (PA6,12), poly(m-xylylene adipamide) (PAMXD6), polyhexamethylene adipamide/polyhexamethyleneterephtalamide copolymer (PA66/6T), polyhexamethylene adipamide/polyhexamethyleneisophtalamide copolymer (PA66/6I) and derivatives or blends/mixtures thereof.

Preferred vinyl polymers include polystyrene (PS), polyvinyl chloride (PVC), polyvinyl chloride (PVdC), ethylene vinyl acetate (EVA), ethylene vinyl alcohol (EVOH), polyvinyl alcohol (PVOH) and derivatives or blends/mixtures of these materials.

In a particular embodiment, the first thermoplastic polymer is selected from thermoplastic polymers having a transformation temperature (Tf) above 120° C., preferably above 150° C., more preferably above 180° C. and/or a glass transition temperature (Tg) above 10° C. In another particular embodiment, the first thermoplastic polymer is selected from semi-crystalline polymers having a melting temperature (Tm) above 120° C. preferably above 150° C., more preferably above 180° C. and/or a glass transition temperature (Tg) above 10° C. In another embodiment, the first thermoplastic polymer is selected from amorphous polymers having a softening temperature above 120° C., preferably above 150° C., more preferably above 180° C. and/or a glass temperature (Tg) above 10° C.

In a particular embodiment, the first thermoplastic polymer is selected from aliphatic polyester, preferably from polylactic acid (PLA).

In another particular embodiment, the first thermoplastic polymer is selected from semi-aromatic polyester, preferably from polyethylene terephthalate (PET) or copolymers thereof such as PET-G (glycolyzed PET) or low-melt PET. Alternatively, the first thermoplastic polymer is selected from PTT or PBT.

In another particular embodiment, the first thermoplastic polymer is selected from polyamide, preferably from PA6 or PA6,6. The first plastic material may further comprise one or more additives. Generally speaking, the additives are used in order to enhance specific properties in the region of the plastic product made of the first plastic material. For instance, the additives may be selected from the group consisting without limitation of plasticizers, coloring agents, processing aids, rheological agents, anti-static agents, anti-UV agents, toughening agents, anti-fogging agents, compatibilizers, slip agents, flame retardant agents, anti-oxidants, light stabilizers, oxygen scavengers, inks, adhesives, fertilizers, and phytosanitary products. Advantageously, the first plastic material comprises less than 30% by weight (wt %) of such additives, preferably less than 15 wt %, more preferably less than 5 wt % or less than 1 wt %.

In a particular embodiment, a compatibilizer can be added to the first plastic material to increase adhesion between the first and second plastic materials. For instance, compatibilizers for polyesters may be selected from polyacrylates, ethylene terpolymers, acrylic esters, glycidyl methacrylate, triblock copolymers, maleic anhydride and/or maleic anhydride grafted polymer.

In a particular embodiment, the first plastic material comprises an anti-acid filler. The term "anti-acid filler" is used to designate a filler that has the ability to chemically neutralize an acid molecule, even contained in a plastic material (or produced by the degradation of such plastic material). The neutralizing reaction performed by an anti-acid filler is generally based on ion exchange. The presence of an anti-acid filler in a plastic material may help to increase and/or maintain the pH of the composition. Anti-acid fillers may be mineral or organic, synthetic or natural, and used alone or as a mix of several anti-acid fillers. The anti-acid filler can be selected from hydrotalcite, calcium carbonate, talc, mica, clay and/or calcium hydroxide. Preferably, the anti-acid filler represents between 0.1% and 30% by weight of the first plastic material, based on the total weight of the plastic material, preferably between 2 wt % and 15 wt %, more preferably between 1 wt % and 10 wt %.

Advantageously, the first thermoplastic material comprises less than 30 wt % of both additives and anti-acid fillers, preferably less than 15 wt %, more preferably less than 5 wt % or less than 1 wt %.

Second Thermoplastic Material

According to the invention, the second plastic material comprises a second thermoplastic polymer, a degrading enzyme and optionally additives and/or fillers. Preferably, the second plastic material comprises at least 70%, 75%, 80%, 85%, 90%, 95% by weight of a second thermoplastic polymer, based on the total weight of the thermoplastic material. The additives and/or fillers can be same as or different from the additives and fillers of the first plastic material, including compatibilizers. Advantageously, the second plastic material comprises less than 30% by weight of such additives and/or fillers based on the total weight of the thermoplastic material, preferably less than 15 wt %, more preferably less than 5 wt %, or less than 1 wt %. In a particular embodiment, said second thermoplastic polymer is a mix of polymers of same type (i.e., with same chemical formula) but with different grades.

Advantageously, the second thermoplastic material has a transformation temperature (Tf) below 180° C., preferably a Tf below 150° C., more preferably a Tf below 120° C., even more preferably below 100° C. Particularly, the second thermoplastic material comprises at least 70%, 75%, 80%, 85%, 90%, preferably at least 95% by weight of a second semi-crystalline thermoplastic polymer, based on the total weight of the second thermoplastic material, said semi-crystalline thermoplastic polymer having a melting temperature (Tm) below 180° C., preferably below 150° C., more preferably below 120° C. According to the invention, the second plastic material comprises at least one thermoplastic polymer, different from the thermoplastic polymer of the first plastic material (e.g., with different chemical formula, with different grades, and/or differently formulated to reach different viscosities).

Preferably, the second thermoplastic polymer is selected from water-insoluble polymers.

Advantageously, the second thermoplastic polymer is selected from thermoplastic polymers having a transformation temperature (Tf) below 180° C. and/or a glass transition temperature (Tg) below 70° C. Preferably, the second thermoplastic polymer is selected from thermoplastic polymers having a Tf below 150° C. and/or a Tg below 30° C. More preferably, the second thermoplastic polymer is selected from thermoplastic polymers having a Tf below 120° C. In another particular embodiment, the second thermoplastic polymer is selected from semi-crystalline polymers having a melting temperature (Tm) below 180° C., preferably below 150° C., more preferably below 120° C., even more preferably a Tm below 100° C. and/or a Tg below 70° C., preferably below 30° C. In another embodiment, the second thermoplastic material comprises a mix of semi-crystalline and amorphous second thermoplastic polymer, wherein the mix of polymers has a Tf below 180° C., preferably below 150° C., more preferably below 120° C., and/or a Tg below 70° C., preferably below 30° C. In another embodiment, the second thermoplastic polymer is selected from amorphous polymers having a softening temperature below 180° C., preferably below 150° C., more preferably below 120° C. and/or a Tg below 70° C., preferably below 30° C.

In a particular embodiment, the second thermoplastic polymer is selected from polylactic acid (PLA), polycaprolactone (PCL), polybutylene adipate terephthalate (PBAT), polyhydroxyalkanoate (PHA), polybutylene succinate (PBS), polybutylene succinate adipate (PBSA), polybutylene adipate (PBA), polyglycolic acid (PGA), ethylene-vinyl acetate (EVA), polydioxanone (PDS), polyethylene glycol (PEG), preferably PEG with molecular mass above 600 g/mol, polyethylene oxide (PEO), copolymers and/or derivatives thereof. In a particular embodiment, the second polymer is a copolymer of polylactic acid and polyglycolic acid (PLGA or PLA-co-PGA). In another particular embodiment, the second polymer is PCL. In another particular embodiment, the second polymer is PLA.

The second plastic material preferably contains at least 0.001% by weight of pure degrading enzyme, based on the total weight of the second plastic material. In a particular embodiment, the second plastic material comprises between 0.001 and 30 wt %, preferably between 0.1% and 20 wt %, more preferably between 0.1% and 10 wt % of pure degrading enzyme. In a particular embodiment, the second plastic material comprises about 1% by weight of pure degrading enzyme. In the context of the invention, "pure" degrading enzyme refers to enzyme in absence of any excipients, additives, etc. In a particular embodiment, the second thermoplastic material comprises, based on the total weight of the second thermoplastic material (i) from 70 to 99.9 wt % of at least one polyester, preferably selected from PCL, PBAT, PBSA, PBS, PBA, PGA, PLA, PLGA and PHA and (ii) from 0.1 to 10 wt % of pure degrading enzyme.

According to the invention, the degrading enzyme is selected among enzymes able to degrade the first thermoplastic polymer. Examples of suitable degrading enzymes include, without limitation, depolymerase, hydrolase, esterase, lipase, cutinase, protease, polyesterase, carboxylesterase, oxygenase and/or oxidase such as laccase, peroxidase or oxygenase. The enzymes may be in pure or enriched form (such as concentrated supernatant), or mixed with other excipients or diluents. A combination of enzymes may be used as well. The person skilled in the art will be able to select the appropriate degrading enzyme depending on the nature of the thermoplastic polymer of the first plastic material that must be degraded.

For instance, when the first thermoplastic polymer is PLA, the degrading enzyme may be selected from a protease, preferably selected from *Amycolatopsis* sp., *Amycolatopsis orientalis*, proteinase K from *Tritirachium album*, *Actinomadura keratinilytica*, *Laceyella sacchari* LP175, *Thermus* sp., *Bacillus licheniformis*, *Bacillus thermoproteolyticus* or any commercial enzymes known for degrading PLA such as Savinase®, Esperase®, Alcalase®, Everlase®, Protex®, Optimase®, Multifect® or any enzymes from the family of the subtilisin CAS 9014-01-1 or any functional variant thereof. Examples of suitable proteases are described in WO2016/062695, WO2016/146540 or WO2018/109183. If required, the commercial enzymes may be reformulated (e.g., diafiltrated to remove commercial carrier) before to be mixed with the second thermoplastic polymer. Examples of such reformulations are described in WO2019/043145.

When the first thermoplastic polymer is PET, the degrading enzyme may be a cutinase, preferably selected from *Thermobifida cellulosityca*, *Thermobifida halotolerans*, *Thermobifida fusca*, *Thermobifida alba*, *Bacillus subtilis*, *Fusarium solani pisi*, *Humicola insolens*, *Sirococcus conigenus*, *Ideonella sakaiensis*, *Pseudomonas mendocina* and

*Thielavia terrestris*, or any functional variant thereof. In another embodiment, the cutinase is selected from a metagenomic library such as LC-Cutinase described in Sulaiman et al., 2012 or any functional variant thereof. Examples of suitable cutinases are described in WO2018/011284 and WO2018/011281. In another particular embodiment, the depolymerase is a cutinase from *Humicola insolens*, such as the one referenced A0A075B5G4 in Uniprot or any functional variant thereof. In another embodiment, the depolymerase is a commercial enzyme such as Novozym 51032 or any functional variant thereof.

In a particular embodiment, said degrading enzyme is further able to degrade the polymer of the second thermoplastic material. In a particular example, the cutinase selected to degrade the PET of the first thermoplastic material is also able to degrade the PCL of the second thermoplastic material.

In another embodiment, the second thermoplastic material comprises a degrading enzyme selected from enzymes able to degrade the first thermoplastic polymer and an additional degrading enzyme selected from enzymes able to degrade the second thermoplastic polymer. For instance, the second thermoplastic material comprises PCL, an enzyme able to degrade PCL (e.g., lipase) and a protease able to degrade the PLA of the first thermoplastic material.

In another embodiment, a compatibilizer can be added to the second plastic material to increase the adhesion with the second plastic material. For instance, compatibilizers for polyesters may be selected from polyacrylates, ethylene terpolymers, acrylic esters, glycidyl methacrylate, triblock copolymers, maleic anhydride and/or maleic anhydride grafted polymer.

In a particular embodiment, the second plastic material comprises an anti-acid filler. Advantageously, the depolymerase activity of the degrading enzyme in the plastic material in presence of anti-acid filler is greater than without. Preferably, the anti-acid filler represents between 0.1% and 30% by weight of the second plastic material, based on the total weight of the plastic material, preferably between 2 wt % and 15 wt %.

In a particular embodiment, the second plastic material comprises, based on the total weight of the second plastic material:
  (i) from 70 to 99.8 wt % of at least one polyester, preferably PCL, PBAT, PBSA, PBS, PBA, PGA, PLA, PLGA or PHA;
  (ii) from 0.1 to 29.9 wt % of at least one anti-acid filler and/or additives including compatibilizers, preferably selected from hydrotalcite, calcium carbonate, talc, mica, clay and/or calcium hydroxide;
  (iii) from 0.1 to 10 wt % of pure degrading enzyme.

In a particular embodiment, the degrading enzyme is in a liquid form, i.e. in a formulation containing enzyme(s) and diluent(s) and/or carrier(s), such as stabilizing component(s) and/or solubilizing component(s), including water, glycerol, sorbitol, dextrin, (e.g., maltodextrin and/or cyclodextrin), starch, arabic gum, glycol (e.g., propanediol or mono ethylene glycol), salt, etc. and the second thermoplastic polymer is selected from semi-crystalline polymers having a Tm below 120° C., preferably below 100° C., more preferably below 80° C. Preferably, the degrading enzyme is in a liquid form, formulated with water and/or mono ethylene glycol and/or sorbitol, more preferably formulated with water.

In a particular embodiment, the second plastic material comprises, based on the total weight of the second plastic material:
  (i) from 70 to 99.8 wt % of at least one semi-crystalline polyester having a Tm below 120° C., preferably below 100° C., more preferably below 80° C., and preferably selected from PCL, PBAT, PBSA, PBS, PBA, PGA, PLA, PLGA or PHA;
  (ii) from 0.1 to 29.9 wt % of at least one diluent(s) and/or carrier(s);
  (iii) from 0.1 to 10 wt % of pure degrading enzyme.

In a particular embodiment, the second plastic material further comprises other thermosensitive components, including without limitation plant protecting agents, repair enzymes, luminescent enzymes, insect repellants, perfumes, or drugs. Particularly, said thermosensitive compound still exhibits an activity in the final multicomponent plastic product.

Multicomponent Plastic Products

It is the purpose of the present invention to provide new multicomponent plastic products that comprise two or more thermoplastic materials, which are composed of different thermoplastic polymers and wherein one of the thermoplastic materials includes a degrading enzyme suitable to degrade a polymer of another thermoplastic material of the multicomponent plastic product. According to the invention, the degrading enzyme is able to degrade the first thermoplastic polymer in the multicomponent plastic product. That is to say that the degrading enzyme still exhibits a degrading activity even after the heat treatment(s) to produce the multicomponent plastic product.

According to the invention, the multicomponent product comprises at least two different thermoplastic materials, wherein a first thermoplastic material comprises a first thermoplastic polymer and a second thermoplastic material comprises at least a second thermoplastic polymer and at least one degrading enzyme able to degrade the first thermoplastic polymer and wherein the second thermoplastic material has a transformation temperature (Tf) strictly lower than the transformation temperature (Tf) of the first thermoplastic material and wherein the first and second thermoplastic materials are at least partially adjacent in the multicomponent product.

In a preferred embodiment, the second thermoplastic material has a transformation temperature at least 50° C. below the transformation temperature of the first thermoplastic material, preferably 60° C., 70° C., 80° C. below.

In a particular embodiment, the first plastic material comprises at least 70%, 75%, 80%, 85%, 90%, 95%, 99% by weight, based on the total weight of the first plastic material, of a first thermoplastic polymer, which is selected from semi-crystalline polymers having a Tm above 120° C., preferably above 150° C., more preferably above 180° C.; and the second plastic material comprises at least 70%, 75%, 80%, 85%, 90%, 95%, 99% by weight based on the total weight of the second plastic material of a second thermoplastic polymer, which is selected from semi-crystalline polymers having a Tm below 180° C., preferably below 150° C., more preferably a Tm below 120° C., even more preferably below 100° C. Particularly, the first polymer has a Tm above 180° C. and the second polymer a Tm below 120° C. Alternatively, the first polymer has a Tm above 150° C. and the second polymer a Tm below 100° C.

According to the invention, the at least two thermoplastic materials are arranged within the multicomponent plastic product in different parts or regions physically distinct from each other, i.e. the parts or regions are not intimately mixed. In the context of the invention, a region refers to a part of the plastic product comprising a given thermoplastic polymer, that may be different from a thermoplastic polymer of at least one adjacent region of said plastic product. The physical contact between two adjacent regions allows a degrading enzyme present within one of the regions to degrade a thermoplastic polymer within the adjacent region and eventually to spread in this region.

In a particular embodiment, the plastic product is a bicomponent plastic product made with two distinct thermoplastic materials, as exposed above. Said two distinct thermoplastic materials may be arranged in two or more distinct parts. According to the invention, at least two parts made with distinct plastic materials are adjacent. Advantageously, the heat treatment, or transformation process or processing step, used for manufacturing the multicomponent product is coextrusion, coinjection or extrusion coating, preferably coextrusion. Advantageously, the multicomponent product is selected from multicomponent filaments and multilayer plastic products.

In an embodiment, the multicomponent product is a multicomponent filament. Advantageously, the heat treatment, or transformation process, used for manufacturing the multicomponent filament is coextrusion.

Particularly, the multicomponent filament comprises at least two different thermoplastic materials, wherein
- a first thermoplastic material comprises at least 70%, 75%, 80%, 85%, 90%, preferably at least 95% by weight of a first semi-crystalline thermoplastic polymer, based on the total weight of the first thermoplastic material, and
- a second thermoplastic material comprises at least 70%, 75%, 80%, 85%, 90%, preferably at least 95% by weight of a second semi-crystalline thermoplastic polymer, based on the total weight of the second thermoplastic material, and at least one degrading enzyme able to degrade said first semi-crystalline thermoplastic polymer, wherein the second semi-crystalline thermoplastic polymer has a melting temperature (Tm) below the melting temperature (Tm) of the first semi-crystalline thermoplastic polymer, preferably at least 50° C. below, more preferably 60° C., 70° C., 80° C. below.

Advantageously, said first thermoplastic polymer is selected from semi-crystalline polymers having a Tm above 120° C., preferably above 150° C., more preferably above 180° C.; and said second thermoplastic polymer is selected from semi-crystalline polymers having a Tm below 180° C., preferably below 150° C., more preferably a Tm below 120° C., even more preferably below 100° C. Particularly, the first polymer has a Tm above 180° C. and the second polymer a Tm below 120° C. Alternatively, the first polymer has a Tm above 150° C. and the second polymer a Tm below 100° C.

For instance, the multicomponent product is a bicomponent filament composed of a first and a second thermoplastic materials, wherein the resulting cross-section of the bicomponent filament may resemble a variety of different configurations. For example, the first region and the second region of the bicomponent filament may be arranged in the form of a sheath/core, tipped tri-lobal, bicomponent tri-lobal, side-by-side, islands in the sea, or a segmented pie. Additional arrangements may consist in round cross-sectional shape, oval cross-sectional shape, star shape, flat shape, or rectangular shape. In a particular embodiment, the first and a second thermoplastic materials are arranged in the form of sheath/core. In another particular embodiment, the thermoplastic materials are arranged in the form of segmented pie or island(s) in the sea, to improve the enzyme accessibility to the first polymer. Such islands in the sea arrangement provides degradability to the plastic product, while there is no contact of the enzyme with the outside of the product. This kind of multicomponent product may be particularly interesting for manufacturing products intended to be in contact with the skin of a subject and/or food products. In a particular embodiment, the multicomponent product is a bicomponent filament that comprises a sheath made of the first plastic material and a core made of the second plastic material. This kind of filaments may be of particular interest for manufacturing products able to be in contact with the skin of subjects and/or with food. Indeed, as the enzyme is contained in the core of the filaments, direct contacts with skin or food during storage and use are limited.

Alternatively, the bicomponent filament comprises a core made of the first plastic material and a sheath made of the second plastic material.

In a particular embodiment, the multicomponent product is a multicomponent filament with diameter below 5 mm, preferably below 2 mm. Such multicomponent filament may be used for the production of subsequent plastic articles using 3D printing or any means suitable for shaping a plastic article. Examples of cross-sections of such multicomponent filaments include, without limitation, sheath/core, side-by-side, islands in the sea, or segmented pie cross-sections.

In another embodiment, the multicomponent product is a multicomponent filament with a diameter below 250 µm, preferably below 50 µm. Advantageously, such kind of filaments present circular (sheath/core, side-by-side, islands in the sea, or segmented pie) or tri-lobal cross-sections. Such multicomponent filament may be used for manufacturing yarns to produce textile articles. The yarns are produced using meltspinning extruder to extrude together many dozens of filaments, leading to the production of multifilament yarns, each filament being multicomponent. In a particular embodiment, the yarns can be used for garments, non-woven articles and nets. Non-woven articles may also be produced directly by spunlaid (spunbond or meltblown) of filaments. In a particular embodiment, the multicomponent product is a multicomponent filament comprising at least two thermoplastic materials, wherein the first material comprises PLA and the second thermoplastic material has a transformation temperature at least 50° C. below the transformation temperature of the first thermoplastic material, preferably 60° C., 70° C., 80° C. below. Particularly, the second thermoplastic material comprises PCL.

In a particular embodiment, the multicomponent product is a multicomponent filament comprising at least two thermoplastic materials, wherein the second thermoplastic material comprises PCL and a PLA-degrading enzyme and the first thermoplastic material comprises PLA. Preferably, said multicomponent filament is produced by coextrusion.

In a particular embodiment, the multicomponent product is a multicomponent filament, wherein the second thermoplastic material comprises PLA and a PLA-degrading enzyme and the first thermoplastic material comprises PLA, wherein the first thermoplastic material comprises a grade of PLA which has a Tf and/or Tm higher than the grade of PLA of the second thermoplastic material and/or wherein the second plastic material further comprises additional component(s) such as plasticizers, fillers, or polymer(s) in order to decrease the viscosity of the second plastic material.

In a particular embodiment, the multicomponent product is a multicomponent filament comprising at least two thermoplastic materials, wherein the first material comprises PET or copolymers thereof such as PET-G and the second thermoplastic material has a transformation temperature at least 50° C. below the transformation temperature of the first thermoplastic material, preferably 60° C., 70° C., 80° C.

below. Particularly, the second thermoplastic material comprises PCL, PBAT, PBSA, PBS, PBA, PGA, PLA, PLGA or PHA. Particularly, the multicomponent product is a multicomponent filament, wherein the second thermoplastic material comprises PCL, PBAT, PBSA, PBS, PBA, PGA, PLA, PLGA or PHA and a PET-degrading enzyme and the first thermoplastic material comprises PET or copolymers thereof such as PET-G, wherein the PET of the first thermoplastic material has a Tf and/or Tm higher than the PCL, PBAT, PB SA, PBS, PBA, PGA, PLA, PLGA or PHA of the second thermoplastic material, preferably at least 50° C. higher, more preferably at least 60° C., 70° C., 80° C., 150° C. higher. Preferably, said multicomponent filament is produced by coextrusion.

In another embodiment, the multicomponent product is selected from multilayer plastic products, including multilayer plastic films, multilayer plastic sheets, multinanolayer plastics, multilayer plastic trays, multilayer plastic bottles, multilayer packagings, multilayer profiles and tubes. Advantageously, the heat treatment, or transformation process, used for manufacturing the multicomponent product is coextrusion, coinjection or extrusion coating. Particularly, the heat treatment, or transformation process, used for manufacturing the multilayer plastic trays, multilayer plastic bottles, or multilayer packagings is coinjection.

In a particular embodiment, the multicomponent product is a multilayer plastic product, wherein at least one layer made of second plastic material is adjacent to at least one layer made of first plastic material. The multicomponent product may comprise additional layers or regions of any kind (plastic material, metal compound such as aluminum or foil, glass fiber or carbon fiber, etc.). The layers may have different lengths and/or thicknesses. The layers may overlap entirely or partially. The layers may be bonded with specific adhesive, during the manufacturing, through dedicated processes or may adhere to each other naturally due to polymer compatibility.

In another particular embodiment, the multilayer plastic product comprises at least one layer made of second plastic material sandwiched between two layers made of first plastic material.

Advantageously, the weight ratio first plastic material/second plastic material of the multicomponent product is comprised between 50/50 and 99/1, between 60/40 and 98/2 or between 70/30 and 95/5. In a particular embodiment, the multicomponent product is a bicomponent filament comprising a core of first plastic material and a sheath of second plastic material, wherein the core represents between 30 and 40% by weight of the total weight of the bicomponent filament and the sheath represents 60 to 70% by weight of the total weight of the bicomponent filament. In another particular embodiment, the multicomponent product is a bicomponent filament comprising a core of first plastic material and a sheath of second plastic material, wherein the core represents between 5 and 25% by weight of the total weight of the bicomponent filament and the sheath represents 75 to 95% by weight of the total weight of the bicomponent filament.

In a particular embodiment, the multicomponent product is a multilayer plastic product, wherein the at least one layer of second plastic material represents between 1 and 50%, preferably between 1 and 20% by weight of the total weight of the multilayer plastic product and the at least one layer of first plastic material represents between 50 to 99%, preferably between 80 and 99% by weight of the total weight of the bicomponent filament.

In a particular embodiment, the multicomponent product is a multilayer plastic product, wherein the at least one layer of second plastic material sandwiched between two layers of first plastic material represents between 1% and 50%, preferably between 1% and 20% by weight of the total weight of the multilayer plastic product and the two layers of first plastic material represents between 50% and 99%, preferably between 80% and 99% by weight of the total weight of the bicomponent filament.

In a particular embodiment, the multicomponent product comprises at least two thermoplastic materials, wherein the first thermoplastic polymer is PLA and the second thermoplastic polymer is PCL.

In another particular embodiment, the multicomponent product comprises at least two thermoplastic materials, wherein the first thermoplastic polymer is PET or copolymers thereof such as PET-G and the second thermoplastic polymer is selected from PCL, PBAT, PBSA, PBS, PBA, PGA, PLA, PLGA or PHA.

In another particular embodiment, the multicomponent product comprises at least two thermoplastic materials, wherein the first thermoplastic polymer is PBT or PTT and the second thermoplastic polymer is selected from PCL, PBAT, PBSA, PBS, PBA, PGA, PLA, PLGA or PHA.

In a particular embodiment, the multicomponent product is a multilayer plastic product, wherein at least one layer made of second plastic material comprises PCL and a PLA-degrading enzyme and at least one layer made of first plastic material comprises at least PLA. In a particular embodiment, at least one layer made of second plastic material comprising PCL and a PLA-degrading enzyme is sandwiched between two layers made of first plastic material comprising PLA.

In another particular embodiment, the multicomponent product is a multilayer plastic product, wherein at least one layer made of second plastic material comprises at least a polyester selected from PCL, PBAT, PBSA, PBS, PBA, PGA, PLGA, PLA or PHA and a PET-degrading enzyme, sandwiched between two layers made of first plastic material comprising PET or copolymers of PET such as PET-G.

In another particular embodiment, the multicomponent product is a multilayer plastic product, wherein at least one layer made of second plastic material comprising PCL and a PET-degrading enzyme is sandwiched between two layers made of first plastic material comprising at least PET.

Process of Manufacturing

It is the purpose of the invention to provide a process for preparing a multicomponent plastic product having one or more first regions, made of a first plastic material, at least partially adjacent to one or more second regions, made of a second plastic material.

According to the invention, the process of manufacturing a multicomponent product comprises the steps consisting of
a. selecting a first plastic material comprising a first thermoplastic polymer;
b. selecting a degrading enzyme able to degrade the first thermoplastic polymer;
c. mixing the degrading enzyme with a second thermoplastic polymer at a temperature at which said second thermoplastic polymer is in a partially or totally molten state, to obtain a second plastic material wherein the second thermoplastic material has a transformation temperature (Tf) strictly lower than the transformation temperature (Tf) of the first thermoplastic material;
d. coextruding or coinjecting or extruding coating said plastic materials to obtain a multicomponent product.

Preferably the second thermoplastic material has a transformation temperature at least 50° C. below the transformation temperature of the first thermoplastic material, preferably 60° C., 70° C., 80° C. below.

In a particular embodiment, the first thermoplastic material comprises at least 70%, 75%, 80%, 85%, 90%, preferably at least 95% by weight of a first semi-crystalline thermoplastic polymer based on the total weight of the first thermoplastic material, and the second thermoplastic material comprise at least 70%, 75%, 80%, 85%, 90%, preferably at least 95% by weight of a second semi-crystalline thermoplastic polymer based on the total weight of the second thermoplastic material, and the second semi-crystalline thermoplastic polymer has a melting temperature below the melting temperature of the first semi-crystalline thermoplastic polymer.

The degrading enzyme is mixed with the second thermoplastic polymer and optional additives or fillers at a temperature at which said second thermoplastic polymer is in a partially or totally molten state. Methods for introducing degrading enzymes within a plastic material are described for instance in WO2013/093355, WO2016/198652, WO2016/198650, WO2016/146540, WO2016/062695 and WO2019/043145. According to the invention, the degrading enzyme still exhibits a degrading activity after both the first heat treatment for preparing the second thermoplastic material and the second heat treatment for shaping the multicomponent plastic product.

Advantageously, the degrading enzyme is mixed with the second thermoplastic polymer in an amount between 0.001 to 30% by weight (pure enzyme), based on the total weight of the second plastic material, preferably between 0.1% to 20%, more preferably between 0.1% and 10% by weight of pure degrading enzyme. In a particular embodiment, the second plastic material is prepared by introducing the degrading enzyme in the second thermoplastic polymer during heating the second thermoplastic polymer. More generally speaking, the step of preparation of the second plastic material is performed at a temperature at which the second polymer is in a partially or totally molten state, so that the enzyme is embedded into the second polymer. Preferably, such preparation is performed by extrusion. Alternatively, such preparation is performed by internal mixing or co-kneading. In a particular embodiment, the degrading enzyme under a liquid form is mixed with the second thermoplastic polymer. Preferably the degrading enzyme is in a formulation containing enzyme(s) and water, and the second thermoplastic polymer is selected from semi-crystalline polymers having a Tm below 120° C., preferably below 100° C., more preferably below 80° C.

In a preferred embodiment, the second plastic material is prepared by introducing the second thermoplastic polymer and the degrading enzyme in an extruder, such as a twin-screw extruder. The resulting extrudate may be granulated into solid pellets and optionally dried, until residual humidity decreases below 5%, preferably below 2%, more preferably below 1%, even more preferably below 0.5%.

Such pellets, or more generally the second plastic material, can then be used to prepare the multicomponent product.

According to the invention, the multicomponent plastic product is obtained by shaping the first and second plastic material during heat treatment. Advantageously, both the first and the second plastic materials are in partially and/or totally molten state.

In a particular embodiment, the heat treatment is a co-extrusion treatment, wherein the two plastic materials are introduced in separate extruders, melted and joined in a common die. Advantageously, each extruder comprises one or more heating zones, wherein temperature can be managed independently. It is thus possible to adapt the temperatures within each extruder to the thermoplastic polymer of the considered plastic material. Each plastic material is thus in partially or totally molten state when arriving within the common die.

In a particular embodiment, the temperature within the common die corresponds to the highest temperature between the two extruders, so that both plastic materials are maintained in partially and/or totally molten state. Accordingly, the second plastic material, which contains the degrading enzyme, is submitted to the highest temperature only during the final step of shaping.

In another particular embodiment, the temperature within the common die may be a temperature between the lowest and the highest temperatures of both extruders, provided that both plastic materials are maintained in partially and/or totally molten state in the die.

It is also an object of the invention to provide a process of manufacturing a multicomponent product comprising the steps consisting of
 a. selecting a first plastic material comprising a first thermoplastic polymer;
 b. selecting a degrading enzyme able to degrade the first thermoplastic polymer;
 c. mixing the degrading enzyme with a second thermoplastic polymer at a temperature at which said second thermoplastic polymer is in a partially or totally molten state, to obtain a second plastic material;
 d. processing said thermoplastic materials to obtain a multicomponent product, at processing temperatures wherein said materials are in partially or totally molten state and wherein the processing temperature for the second plastic material is lower than the processing temperature of the first thermoplastic material, preferably at least 50° C. lower.

Advantageously, the processing step used for manufacturing the multicomponent product is coextrusion, coinjection or extrusion coating, preferably coextrusion.

In a particular embodiment, the first thermoplastic polymer is PLA and the second thermoplastic polymer is PCL. The processing temperature (or extruding temperature i.e., temperature within the extruders) for PLA is between 120° C. and 180° C., +/−10° C., whereas the processing temperature (or extruding temperature i.e., temperature within the extruders) for PCL is between 60° C. and 110° C., +/−5° C., and the temperature in the common die is 180° C., +/−10° C.

In another particular embodiment, the first thermoplastic polymer is PLA and the second thermoplastic polymer is PCL. The processing temperature, (or extruding temperature i.e., temperature within the extruders) for PLA is between 190° C. and 230° C., +/−10° C., whereas the processing temperature for PCL (or extruding temperature i.e., temperature within the extruders) is between 70° C. and 120° C., +/−5° C., and the temperature in the common die is 190° C., +/−10° C.

In a particular embodiment, the first thermoplastic polymer is PETG and the second thermoplastic polymer is PCL. The processing temperature (or extruding temperature i.e., temperature within the extruders) for PETG is between 190° C. and 230° C., +/−10° C., whereas the processing temperature (or extruding temperature i.e., temperature within the extruders) for PCL is between 60° C. and 120° C., +/−5° C., and the temperature in the common die is 180° C., +/−10° C.

In a particular embodiment, the first thermoplastic polymer is PET and the second thermoplastic polymer is PCL. The processing temperature (or extruding temperature i.e., temperature within the extruders) for PET is between 250° C. and 280° C., +/−10° C., whereas the processing temperature (or extruding temperature i.e., temperature within the extruders) for PCL is between 60° C. and 150° C., +/−5° C., and the temperature in the common die is 240° C., +/−10° C.

More generally speaking, the first and second plastic materials have preferably close viscosity when arriving in the common die. In the context of the invention, the viscosity of a thermoplastic polymer and of the plastic material containing said thermoplastic polymer is the quantity that describes a fluid's resistance to flow. Formally, viscosity is the ratio of the shearing stress to the velocity gradient in a fluid.

In a particular embodiment, the step of shaping the plastic product is implemented by the common die or spinning pack of the extruders in the coextrusion process. A person skilled in the art would adapt the die or the spinning pack of the co-extruder to the shape needed. The extruder can comprise a coextrusion die selected from sheet die, flat-film die, circular film die, pipe or tubing die, profile extrusion die. For instance, a vertical die with small diameter holes produces bicomponent or multicomponent multifilament textile, i.e. a textile product consisting of several bicomponent or multicomponent filaments. A horizontal die with one or several holes produces multicomponent textile filaments or 3D printing filament. A flat die with an elongated slot produces multilayer films or sheets for thermoforming applications. An annular die in the blow-molding extrusion produces multilayer films. Other dies with particular geometry produce tubes or multilayer profiles. The multilayer extrusion blow molding process may lead to the production of multilayer cans and bottles in which air is injected into the tube outgoing the die.

In a particular embodiment, the co-extruder comprises a spinning pack or die with multifilament or monofilament spinnerets, to produce bicomponent or multicomponent 3D printing monofilament, bicomponent or multicomponent monofilament textile or bicomponent or multicomponent multifilament textile, spunbond or meltblown nonwovens.

In another particular embodiment, the heat treatment is an extrusion coating process, wherein one plastic material is forced by an extruder to go through a horizontal die onto a moving solid sheet or film composed of the other plastic material.

In another particular embodiment, the heat treatment is a co-injection treatment, wherein the two plastic materials are introduced in separate extruders ending in two independent injection ports. Advantageously, each extruder comprises one or more heating zones, wherein temperature can be managed independently. It is thus possible to adapt the temperatures within each extruder to the thermoplastic polymer of the considered plastic material. Each plastic material is thus in partially or totally molten state when arriving at each injection port. The first plastic material comprising the polymer to be degraded and the second plastic material be can be injected simultaneously or sequentially in the mold.

Advantageously, the resulting multicomponent plastic product is a biodegradable plastic product in aerobic and/or anaerobic conditions complying with at least one of the relevant standards and/or labels known by a person skilled in the art such as standard EN 13432, standard NFT51800, standard ASTM D6400, OK Biodegradation Soil (Label TÜV Austria), OK Biodegradation Water (Label TÜV Austria), OK Compost (Label TÜV Austria), OK Compost Home (Label TÜV Austria), standard ISO 15985:2014, standard ASTM D5526, standard ISO 15985, standard ASTM D 5511. Alternatively, methane can be produced using the resulting multicomponent plastic product. Such plastic product may be used in the manufacture of composite (e.g., polymeric matrix and glass or carbon fibers) to improve the delamination of the different parts of the composite. For instance, the composite comprises a multicomponent product of the invention and glass or carbon fiber(s) embedded within. The biodegradability of the polymeric matrix (i.e., the multicomponent product) allows to recover the glass or carbon fiber(s) at the end of life of the composite. In another embodiment, the polymeric matrix comprises a recyclable polymer and multicomponent fibers of the invention are embedded within. The biodegradability of the multicomponent fibers allows to recover the polymer for subsequent recycling.

Inclusion of Other Thermosensitive Components

It is also a purpose of the invention to provide plastic products containing any thermosensitive compound. The present invention thus provides plastic products that comprise two or more distinct plastic materials, composed of different thermoplastic polymers, and at least a thermosensitive compound. A first plastic material is free of thermosensitive compound, whereas another plastic material comprises a thermosensitive compound. The thermosensitive compound is incorporated within the second plastic material. According to the invention, the two or more plastic materials are at least partially adjacent and are not intimately mixed.

The present invention also provides a process for manufacturing such multicomponent plastics. Interestingly, the invention makes it possible to introduce the thermosensitive compound within a thermoplastic material with a transformation temperature below the transformation temperature of the thermoplastic material deprived of thermosensitive compound. Accordingly, with the process of the invention, it is possible to produce a thermoplastic product comprising both thermoplastic polymer with high transformation temperature and a thermosensitive compound, wherein the thermosensitive compound still exhibits an activity in the thermoplastic product.

Particularly, such thermosensitive compound may be selected from plant protecting agents, repair enzyme (such as enzyme detecting and repairing mismatched bases insertion during DNA synthesis or such as enzyme repairing polymers such as PHA synthase, esterase and/or lipase), luminescent enzymes, insect repellants, perfumes, or drugs.

In a particular embodiment, the thermosensitive compound is a drug selected from pharmaceutical compound, peptides, proteins, antibiotics, analgesics, vaccines, vaccine adjuvants, anti-inflammatory agents, anti-tumor agents, hormones, cytokines, anti-fungal agents, anti-viral agents, anti-bacterial agents, anti-diabetics, steroids, specific enzyme inhibitor, growth stimulating agent, immunosuppressors, immuno-modulators, anti-hypertensive drugs, anti-arrhythmic drugs, inotropic drugs, addiction therapy drugs, anti-epileptic drugs, anti-aging drugs, drugs to treat neuropathies or pain, hypolipemic drugs, anti-coagulants, antibodies or antibody fragments, antigens, anti-depressant or psychotropic agents, neuro-modulators, drugs for treating a disease selected from brain disease, liver disease, pulmonary disease, cardiac disease, gastric disease, intestine disease, ovary disease, testis disease, urological disease, genital disease, bone disease, muscle disease, endometrial disease, pancreatic disease and/or renal disease, ophthalmic drugs, anti-allergic agents, contraceptive or luteinizing agents and mixtures of at least two of these drugs. In such embodiment, the product of the invention is a medical device, preferably selected from implant, film, stent, leaflet, valve, coil, scaffold, dressing, rod, patch, fibers, suture fibers, screw, bone plate or implant, bone cement and prostheses.

EXAMPLES

Example 1—Production of a Multicomponent PLA Monofilament for Use in 3D Printing A. Preparation of a Second Thermoplastic Material A thermoplastic material comprising enzyme (MB) was prepared with pellets of polycaprolactone polymer (PCL-Capa™ 6500 from Perstorp, $T_m$~60° C., Tf 70-120° C. for extrusion (Cast Films and Sheets) and 60-75° C. for extrusion blow-moulding) and a formulated liquid enzyme of Savinase® 16L (from Novozymes), at a ratio of 90%/10% w/w respectively. A control composition (MBC) was prepared with polycaprolactone and a liquid composition free of enzyme in same proportions as MB.

The compositions of the formulated enzyme and control used respectively for MB and MBC are detailed in Table 1.

TABLE 1

Liquid compositions for MB and MBC.

| Liquid composition | Formulated enzyme for MB (% w/w) | Control composition for MBC (% w/w) |
|---|---|---|
| Water | 52 | 78 |
| Arabic gum | 22.4 | 22 |
| Enzyme from Savinase ® 16L | 15.1 | 0 |
| Other compounds including polyols (proteins, glycerol, propylene glycol) and other additives | 10.5 | 0 |

The thermoplastic material comprising enzyme (MB) and controlled material (MBC) were prepared using a co-rotative twin screw extruder (Leistritz ZSE 18MAXX). This compounding machine comprised nine successive heating zones Z1 to Z9, wherein the temperatures may be independently controlled and regulated. An additional zone Z10 was present after zone Z9, corresponding to the head of the twin-screw (Z10) which is also a heated part. A suited screw profile was used in order to mix efficiently the liquid formulation with the melt polymer. The PCL and each liquid formulation have been introduced separately in the extruder. PCL has been introduced in Z2 with a gravimetric dosing unit using a side feeder. The liquid formulation has been introduced directly on the first feeding zone (Z0) of the extruder using a Brabender pump. The molten polymer arrived in the screw Z10 comprising a die plate with one hole of 3.5 mm and has been immediately immersed in a 2 m long cold-water bath. The resulting extrudate has been granulated into solid pellets <3 mm. In this experiment, 90% by weight of the PCL have been extruded with 10% by weight of the liquid composition. MB and MBC have been dried on vacuum oven at 45° C. until residual humidity decreased below 0.5%.

Parameters used for each extruded composition are summarized in Table 2.

TABLE 2 parameters used for each extruded composition (thermoplastic material with enzymes MB and control thermoplastic material MBC).

| Thermoplastic material | Temperature profile (° C.) from Z1 to Z10 | Polymer Flow rate (kg/h) | Liquid composition Flow rate (kg/h) | Speed screw rate (rpm) |
|---|---|---|---|---|
| MBC | 70-70-70-70-70-65-65-65-65-65 | 2.7 | 0.3 | 150 |
| MB | | 1.8 | 0.2 | 150 |

B. Production of Multicomponent Filaments by Coextrusion a. Filament Production

Filaments were produced using the compositions prepared in Example 1-A for the core (Tf for MB and MBC materials were determined for said filament production between 80-120° C.) and polylactic acid for the sheath (4043D PLA grade from NatureWorks $T_g$ 55-60° C., $T_m$ 145-160° C., Tf 190-200° C. for biaxially oriented films as defined in technical data sheet, and the Tf was determined 170° C.-200 for said filament production), which is known to be depolymerized by Savinase® 16L (see Oda et al., 2000 and depolymerization tests in aqueous medium (not shown)), and using 2 single screw extruders (Rheoscam Scamex), one for each region joining through the die outlet. Core extruder has 4 heating zones and a ratio length/diameter (L/D)=20 and was used for the composition prepared in Example 1-A. The $4^{th}$ heating zone corresponds to the bicomponent die. Sheath extruder has 3 heating zones and a ratio L/D=11 and was used for PLA.

The filament temperature at the die outlet was about 160° C. with die at 190° C. and 150-155° C. with die at 180° C. Filaments were cooled down with compressed air. Filaments with diameter close to 1.75 mm were obtained. At these temperature profiles, PLA flow rate was setup at its maximum and MB/MBC flow rates were setup at their minimum. The percentage of incorporation of the compositions prepared in Example 1-A was measured by DSC afterward and lead to PLA bicomponent filaments (Z2 and Z3) incorporating the MB composition as a core and a negative control filament without enzyme (C11) incorporating the MBC composition as a core.

A monofilament (M) was also produced by dry-blending the MB from Example 1A with PLA in a ratio 40%/60% w/w and the mix was then extruded in the sheath extruder at 100-170-180° C. passing through the die at 160° C. After extrusion, such monofilament containing enzymes was stickier and more colored than the bicomponent filament and a caramel odor was present.

Parameters of the process are listed in Table 3 below.

TABLE 3

Parameters used for the extrusion of filaments

| Filament reference | Filament composition | PLA extrusion temperature profile (° C.) | MB or MBC extrusion temperature profile (° C.) | Die temperature (° C.) | % core measured by DSC |
|---|---|---|---|---|---|
| C11 | Bicomponent MBC + PLA (control) | 100-170-190 | 50-100-120 | 190 | about 30 to 40% |
| Z2 | Bicomponent MB + PLA (with enzyme) | 100-170-190 | 50-100-120 | 190 | about 30 to 40% |
| Z3 | Bicomponent MB + PLA (with enzyme) | 100-170-190 | 50-100-100 | 180 | about 30 to 40% |
| M | MB + PLA (dry-blend) | 100-170-180 | — | 160 | Not applicable | b. Measure of the Enzyme Activity in Filament

A first experiment was done to measure the remaining enzymatic activity in the filaments.

Bicomponent filaments Z2 and Z3 were cut in order to recover the PCL core containing the enzyme. They were then dissolved in dichloromethane, and enzyme was extracted by addition of Tris, HCl buffer 100 mM pH 9.5.

The enzymatic activity was measured with pNA test. The test revealed that there is 45% and 56% of residual activity in the core of Z2 and Z3 respectively, as compared to 100% of enzymatic activity introduced in the MB. The same experiment was performed by completely dissolving the filaments (i.e., including their PLA sheath). Same results were obtained.

A second experiment was performed to assess depolymerization of the filaments.

Depolymerization test has been performed in cellulose dialysis tubing membrane (cut off 14 kDa) with 3 mL of Mod5 (KH$_2$PO$_4$ 0.5 g/L, K$_2$HPO$_4$ 0.5 g/L, (NH$_4$)$_2$SO$_4$ 1 g/L, MgSO$_4$, 7 H$_2$O 0.2 g/L, CaCl$_2$ 0.1 g/L, ZnSO$_4$-7H$_2$O 0.01 g/L, FeSO$_4$-7H$_2$O 0.02 g/L) introduced in 50 mL of Tris-HCl buffer 0.1 M pH 9.5 and incubated at 45° C. or 28° C. Released lactic acid and lactic acid dimers have been measured by HPLC by taking samples in the buffer outside the dialysis tubing. Hydrolysis of plastic articles was evaluated by comparing the amount of LA and dimers of LA released to the amount of LA initially contained in the PLA in the plastic composition. The test has been realized with filaments (cut in fragments of about 5 mm) or with powder obtained by micronization of the filaments at 500 μm 18 000 rpm after immersion in liquid nitrogen. Filaments or powder have been introduced in the dialysis tubing membrane.

Table 4 below gives the percentage of depolymerization of the filaments at 45° C. or 28° C.

TABLE 4

Rate of depolymerization of bicomponent filaments of the invention, compared with enzymatic monofilament and negative control bicomponent filament.

| | PLA depolymerization rate (%) in buffer pH 9.5 at 45° C. after 8 days | | PLA depolymerization rate (%) in buffer pH 9.5 at 28° C. after 14 days |
|---|---|---|---|
| | Filament ~5 mm | Powder 500 μm | Powder 500 μm |
| C11 - die 190° C. (negative control bicomponent filament) | 0.1 | 0.3 | 0 |
| Z2 - die 190° C. (bicomponent filament of the invention) | 36 | 49 | 17 |
| Z3 - die 180° C. (bicomponent filament of the invention) | 44 | 55 | 27 |
| M (dry-blended monofilament with enzyme) | 4 | 23 | 7 |

The results show that bicomponent filaments Z2 and Z3 are depolymerized faster than a dry-blended filament M at both temperatures (45° C. or 28° C.). The depolymerization test performed on Z2 confirms that an enzyme activity is maintained in the bicomponent filament even when a die at 190° C. is used.

C. Specimen Production through 3D Printing a. Plastic Article Production i. Using a FDM printer 3D plastic articles were produced from filaments of Example 1-B, using a FDM printer (Neocore D33D) with a 30×30 cm plate.

A printing temperature of 170° C. was chosen for all the samples and the bed temperature was 40° C. A print bed is the surface of a 3D printer where a print head lays down the materials that make up a 3D print. Specimens were printed with layers of 200 μm: 75×12.5×2 mm (3 specimens using filaments C11, Z3 and M1 which show similar appearance than one specimen of commercial PLA). The printing speed was 65-70 mm/s which corresponds to the higher speed generally used for PLA.

ii. Using a 3D pen

A sample of Z3 filament of Example 1-B has also been printed at higher temperature (220° C.) using a 3D pen (3DPEN-2 RoHS).

b. Test of Depolymerization

A test of depolymerization has been performed on powders obtained from 3D plastic articles (produced using a FDM printer) made of C11, Z3 and M1 in dialysis tubing cellulose membrane (cut off 14 kDa) with 3 mL of Mod5 introduced in 50 mL of Tris-HCl buffer 0.1 M pH 9.5 at 45° C. (B2401-B2406). The rate of lactic acid and lactic acid dimers has been measured by HPLC as in Example 1.B.b.

Table 5 below give the percentage of depolymerization of the plastic article at 45° C. under 1 mm powder form.

TABLE 5

Rate of depolymerization of 3D printed plastic articles produced from enzyme-containing filaments

| 3D plastic article (FDM printer) | Rate of PLA depolymerization (%) in buffer after 7 days |
|---|---|
| Plastic article made of C11 | 0.3 |
| Plastic article made of Z3 | 30 |
| Plastic article made of M1 | 11 |

The rate of PLA depolymerization at 45° C. of 3D plastic article of the invention (Z3) confirms that there is a residual enzyme activity in the 3D specimen produced with a filament of the invention, and that the enzyme may support three steps of heating. The results show that the 3D plastic articles produced with bicomponent filament Z3 is depolymerized faster than the one produced with the dry-blended filament M1.

A test of PLA depolymerization was also performed at 45° C. during 1 day on extrudates of the plastic product printed from Z3 filament with the 3D pen at 220° C. compared with the Z3 filament extrudates (without printing). 3D printed Z3 filament shows a 39% residual enzyme activity as compared to the initial Z3 filament residual enzyme activity (without printing). This experiment confirms that there is a residual enzyme activity in the 3D specimen produced with a filament of the invention, and that the enzyme may support three steps of heating, even with a third heating step above 200° C.

c. Biodegradation in Soil

A small fragment of each plastic article made of C11 or Z3 (and produced using a FDM printer—see Example 1-C-a-i) has been incubated in soil at 28° C. in Oxitop® respirometer and degradation was evaluated by $CO_2$ assay, according to the standard NF U52-001.

After 6 months, 18% of biodegradation was observed for the plastic article made of enzymated bicomponent filament Z3 and only 3% for the plastic article made of control bicomponent filament without enzyme C11.

Coextrusion is thus beneficial to reduce the loss of enzyme activity due to heating during the production of filaments, and to avoid a coloration linked to enzyme formulation. The bicomponent filament can be easily shaped with 3D printing and an enzyme activity is maintained after printing.

Example 2—Production of a Multicomponent PLA Multifilament for Use in Textile Application A. Preparation of a Second Thermoplastic Material A thermoplastic material comprising enzyme (MB2) was prepared with pellets of polycaprolactone polymer (PCL-Capa™ 6250 from Perstorp, MFI=7-11 g/10 min at 80° C.) and a formulated enzyme of Savinase® 16L (from Novozymes), respectively 90%/10% w/w. The composition used is detailed in Table 6.

TABLE 6

Liquid composition to be introduced in the PCL plastic composition

| Liquid enzyme composition | (% w/w) |
|---|---|
| Water | 52.7 |
| Arabic gum | 22.8 |
| Enzyme from Savinase ® 16 L | 17.2 |
| Other compounds including polyols (proteins, glycerol, propylene glycol) and other additives | 7.3 |

The thermoplastic material MB2 was prepared using same method and same co-rotative twin screw extruder (Leistritz ZSE 18MAXX) as in Example 1.

Parameters used for the extruded composition are summarized in Table 7.

TABLE 7

Parameters used for MB2 extruded composition

| Composition reference | Temperature profile (° C.) | Polymer Flow rate (kg/h) | Liquid composition Flow rate (kg/h) | Speed screw rate (rpm) |
|---|---|---|---|---|
| MB2 | 60-60-70-70-70-70-65-65-70-70 | 3.6 | 0.4 | 150 |

B. Production of Multifilament by Coextrusion a. Spinning of Bicomponent Multifilament 2 PLA grades from NatureWorks were used for spinning: 6362D (amorphous PLA, Tg=66° C., MFI=70-85 g/10 min at 210° C., Tf 220-245° C. (specialized fibers)) and 6202D (semi-crystalline PLA, Tg=66° C., Tm=168° C., initial crystallinity=36%, MFI=15-30 g/10 min at 210° C., Tf 220-240° C. (fiber melt spinning)). 6202D is the common PLA grade used in non-woven applications. Tf for 6362D and 6202D materials for said multifilament production were respectively determined at 190° C.-210° C. and 220° C.-240° C.

Production of 36 strand multifilaments comprising MB2 in core (Tf for MB2 was determined between 70-90° C. for said multifilament production) and PLA in sheath were produced using a meltspinning extruder with 3 drawing rolls and a winding machine (Hills) with the parameters indicated in Table 8. Sheath and core single screw extruders have both 3 heating zones, a ratio L/D=30 and a diameter of 19 mm. The die has a diameter of 0.35 mm. Different drawing ratios were applied to the multifilaments. A control multifilament (MFC) was prepared using 30% PCL 6250 and 70% PLA 6202D using same parameters indicated in Table 8.

TABLE 8

Parameters used for the spinning of PLA multifilaments

| Reference | Composition | PLA extrusion temperature profile (° C.) | MB or MBC extrusion temperature profile (° C.) | Die temperature (° C.) | % core estimated by infeed rate | Drawing ratio |
|---|---|---|---|---|---|---|
| MF1 | PLA6202D/MB2 | 200-210-230 | 80-85-90 | 190 | About 30% | 1.5 |
| MF2 | PLA6362D/MB2 | 190-195-200 | 70-70-70 | 190 | About 20% | 1.5 |
| MF3 | PLA6362D/MB2 | 190-195-200 | 70-70-70 | 190 | About 20% | 2.4 |
| MFC (control) | PLA6202D/PCL6250 | 200-210-230 | 80-85-90 | 190 | About 30% | 1.5 | b. Test of Depolymerization of PLA Multifilaments

The test of depolymerization of multifilaments has been performed in dialysis tubing cellulose membrane (cut off 14 kDa) with 3 mL of Mod5 introduced in 50 mL of Tris-HCl buffer 0.1 M pH 8 at 28° C. or pH 9.5 at 45° C. Lactic acid and dimers of lactic acid have been measured by HPLC according to Example 1. Results are shown in Table 9 below.

TABLE 9

Depolymerization rate for enzymated multifilaments and their control

| | Rate of PLA depolymerization (%) in buffer (dialysis system) | |
|---|---|---|
| Multifilaments | after 2 days at 45° C. | 28° C. |
| MF1 (PLA6202D/MB2) | 77% | 29% after 8 days |
| MF2 (PLA6362D/MB2) | (test not performed) | 21% after 13 days |
| MF3 (PLA6362D/MB2) | (test not performed) | 11% after 13 days |
| MFC (PLA6202D/PCL 6250) (control) | 0.3% | 0% after 8 days |

The depolymerization tests showed that the enzyme in the multifilament product is still active and allows the degradation of the PLA of the multifilament.

c. Biodegradation in Soil

Multifilaments MF1 and MFC have been incubated in soil at 28° C. in Oxytop 9 and degradation was evaluated by $CO_2$ assay, according to standard NF U52-001.

After 98 days, the biodegradation rate of the enzymated bicomponent multifilament MF1 was twice the biodegradation rate observed for the control bicomponent filament MFC without enzyme. At that time, the biodegradation rate of the control had already reached a plateau contrary to the biodegradation rate of the enzymated bicomponent multifilament which was still increasing.

Example 3—Production of a Multicomponent PETG Filament

A. Preparation of a Second Thermoplastic Material

A thermoplastic material comprising enzyme (MB) was prepared with pellets of polycaprolactone polymer (PCL-Capa™ 6500 from Perstorp) and liquid composition containing a LC-cutinase selected for its ability to degrade polyethylene terephthalate (Sulaiman et al., Appl Environ Microbiol. 2012 March) produced from recombinant expression in Trichoderma reesei, respectively 80%/20% w/w. The capacity of such cutinase to depolymerize polyethylene terephthalate glycol-modified PETG (Selenis Mimesis DP 300 Natural, PET with comonomer of NPG neopentyl glycol (2,2-dimethylpropane-1,3-diol)). has been validated (data not shown).

A control thermoplastic material (MBC) was prepared from polycaprolactone and liquid composition free of enzyme in same proportions. Liquid compositions are detailed in Table 10.

TABLE 10

Liquid compositions for MB and MBC.

| Liquid composition | Formulated enzyme for MB (% w/w) | Control liquid composition for MBC (% w/w) |
|---|---|---|
| Water | 49.6 | 50 |
| Arabic gum | 50.0 | 50 |
| Enzyme | 0.4 | 0 |

MB and MBC were prepared using same method and same co-rotative twin screw extruder (Leistritz ZSE 18MAXX) as in Example 1. Parameters used for each extruded composition are summarized in Table 11.

TABLE 11 parameters used for each extruded composition (enzymatic composition MB and a control one MBC).

| Composition reference | Temperature profile (° C.) | Polymer Flow rate (kg/h) | Liquid composition Flow rate (kg/h) | Speed screw rate (rpm) |
|---|---|---|---|---|
| MBC | 70-70-70-70-70-65-65-65-65-65 | 2.4 | 0.6 | 150 |
| MB |  | 2.4 | 0.6 | 150 |

B. Production of Filament by Coextrusion a. Bicomponent Filament Production with Core made of PETG and Depolymerization Test Filaments were produced using the compositions prepared in Example 3-A (Tf for MB and MBC were determined between 60-70° C. for said filament production) and PETG (Selenis Mimesis DP 300 Naturel, typical processing temperatures 180-250° C.). The Tf of the corresponding thermoplastic material, containing said PETG, is between 180-250° C. according to the technical data sheet, and was modulated between 190-230° C. to take account of the processing step of said filament.

The same 2 single screw extruders (Rheoscam Scamex) used in Example 1 were used. MB or MBC formed the sheath (30%) and PETG the core. The die temperature was 180° C. Filaments were cooled down with compressed air and water bath. A filament with a diameter close to 1.75 mm was obtained. Parameters of the process are listed in Table 12 below.

TABLE 12

Parameters used for the extrusion of bicomponent filament.

| PETG extrusion temperature profile (° C.) | MB or MBC extrusion temperature profile (° C.) | Die temperature (° C.) |
|---|---|---|
| 190-230-230 | 60-65-65 | 180 |

Depolymerization test has been performed on filaments (cut in fragments of about 5 mm) in 50 mL of phosphate 100 mM buffer pH 8 and incubated at 60° C., the optimal temperature of the cutinase, to show enzymatic activity after extrusion. Terephthalic acid release has been measured by HPLC. Hydrolysis of plastic articles was evaluated by comparing the amount of terephthalic acid released to the amount of terephthalic acid initially contained in the PET in the plastic composition.

52% of depolymerization was obtained after 3 months incubation of the filament produced with MB, showing that enzyme activity is maintained even if a die at 180° C. is used. The filament produced with MBC (without enzyme) show no depolymerization.

b. Bicomponent Filament Production with Sheat made of PETG and Depolymerization Test Filaments were produced using the compositions prepared in Example 3-A and PETG.

The same 2 single screw extruders (Rheoscam Scamex) used in Example 3-B-a were used. MB or MBC was used for the core (30%) and PETG for the sheath. Parameters of the process are the same as for Example 3-B-a (see Table 12) except die temperature which was regulated at 210° C. or 230° C.

Depolymerization test has been performed similarly as for filaments produced in Example 3-B-a. 76% and 38% of depolymerization were obtained after 3 months of incubation of the filaments produced with MB and die at 210° C. and 230° C. respectively, showing that enzyme activity is maintained even if a die at 230° C. is used. The filament produced with MBC (without enzyme) show no depolymerization.

Example 4—Coextrusion with Sheath Made of PET and Depolymerization Test

A. Preparation of a Second Thermoplastic Material

A thermoplastic material comprising enzyme (MB) was prepared with pellets of polycaprolactone polymer (PCL-Capa™ 6500 from Perstorp) and liquid composition containing a variant of LC-cutinase (comprising the following mutations F208I+D203C+S248C+V170I+Y92G) produced from recombinant expression in *Trichoderma reesei*, respectively 80%/20% w/w.

Liquid composition of enzyme is detailed in Table 13.

TABLE 13

Liquid compositions for MB

| Liquid composition | Formulated enzyme for MB (% w/w) |
|---|---|
| Water | 45.7 |
| Arabic gum | 29.9 |
| MEG | 23.1 |
| Enzyme | 1.25 |

MB was prepared using co-rotative twin screw extruder (Leistritz ZSE 18MAXX). PCL was fed in Z2 and liquid composition in Z6. Parameters used are summarized in Table 14.

TABLE 14 parameters used for production of extruded composition MB (thermoplastic material with enzymes).

| Composition reference | Temperature profile (° C.) | Speed screw rate (rpm) |
|---|---|---|
| MB | 70-70-70-70-70-65-65-65-65-65 | 150 |

B. Production of Bicomponent Filament by Coextrusion

The same 2 single screw extruders (Rheoscam Scamex) used in Example 3-B-a were used. MB was used for the core (30%—Tf for MB material was determined between 60-150° C. for this particular filament production)) and PET was used for the sheath (701K Xpure Indorama, Tm 224° C., Tf determined at 240-280° C. for said process). Extrudate was cooled down with compressed air and water bath. Parameters of the process are listed in Table 15 below.

TABLE 15

Parameters used for the extrusion of bicomponent filament.

| PET extrusion temperature profile (° C.) | MB extrusion temperature profile (° C.) | Die temperature (° C.) |
|---|---|---|
| 250-260-270 | 65-80-150 | 240 |

Depolymerization was performed similarly as performed in Example 3-B-a, at 60° C. and 45° C. 39% and 5% of depolymerization were obtained respectively at 60° C. and 45° C. after 13 days of incubation of the filaments produced with MB, showing that enzyme activity is maintained even if a die at 240° C. is used. PET 701K without enzyme incubated in the same conditions show no depolymerization. A depolymerization at 45° C. is of particular interest to compost PET articles.

Example 5—Production of a Multicomponent Nonwoven PLA Product

Enzymated MB was prepared in the same conditions as in Example 2, with 90% PCL CAPA 6500 and 10% formulated enzyme of Savinase 16L. 1509 filaments of 350 µm diameter were processed using a 37 island-in-sea die and composed of 20% MB in "islands" and 80% PLA 6100D (Tf 220-240° C. (fiber melt spinning)) in "sea". Tf for MB and PLA materials were respectively determined at 70-100° C. and 220-240° C. for said particular nonwoven production process). 2 spunbond nonwovens have been produced with different surface mass (Hills machine). The spinning distance was 830 mm. Cooling was performed with air at 1.5 bar. Laying distance was 600 mm. Nonwoven passed through a compact roll before being calendered at 80° C.

The initial temperature profile was defined according to Table 16 below.

TABLE 16

Temperature profile for the extrusion of multicomponent nonwoven multifilament.

| Setpoint temperature (° C.) | Z1 | Z2 | Z3 | Z4 | Z5 | Pump | Die | Cooling air | Calendering |
|---|---|---|---|---|---|---|---|---|---|
| MB | 70 | 70 | 70 | 70 | 70 | 100 | 190 | 12 | 80 |
| PLA | 200 | 210 | 220 | 235 | — | 235 | | | |

Nonwovens have been characterized in traction. Results are summarized in Table 17 below.

TABLE 17

Mechanical properties of multicomponent nonwoven multifilament of the invention

| | Surfacic mass (g.100 cm$^2$) | Air permeability 200 Pa - 20 cm$^2$ l/m$^2$/sec | Tensile strength machine direction N/50 mm | Tensile strength cross machine direction N/50 mm |
|---|---|---|---|---|
| 20% MB/PLA | 64 | 1347 | 63 | 80 |
| | 158 | 280 | 259 | 151 |

For a wipe application, a surface mass close to 50 g/100 cm2 is targeted with tensile strength in both directions superior to 25 N/50 mm. For mulching application, higher surface masses are targeted with tensile strength in both directions superior to 50 N/50 mm. Results show that enzymated nonwoven can be produced with different surface masses suitable for different applications with interesting properties.

The invention claimed is:

1. A multicomponent plastic product comprising at least two different thermoplastic materials, wherein
    a first thermoplastic material comprises a first thermoplastic polymer, and
    a second thermoplastic material comprises at least a second thermoplastic polymer and at least one degrading enzyme able to degrade the first thermoplastic polymer, wherein the degrading enzyme is not a drug and wherein the second thermoplastic polymer is water-insoluble,
    wherein the second thermoplastic material has a transformation temperature (Tf) at least 50° C. lower than the transformation temperature (Tf) of the first thermoplastic material and wherein the first and second plastic materials are at least partially adjacent in the multicomponent product.

2. The multicomponent plastic product according to claim 1, said multicomponent plastic component comprising at least two different thermoplastic materials, wherein
    the first thermoplastic material comprises at least 70% by weight of a first semi-crystalline thermoplastic polymer, based on the total weight of the first thermoplastic material, and
    the second thermoplastic material comprises at least 70% by weight of a second semi-crystalline thermoplastic polymer, based on the total weight of the second thermoplastic material, and at least one degrading enzyme able to degrade said first semi-crystalline thermoplastic polymer,
    wherein the second semi-crystalline thermoplastic polymer has a melting temperature (Tm) below the melting temperature (Tm) of the first semi-crystalline thermoplastic polymer and wherein the first and second plastic materials are at least partially adjacent in the multicomponent product.

3. The multicomponent plastic product according to claim 1, wherein the second thermoplastic material has a transformation temperature (Tf) below 180° C.

4. The multicomponent plastic product according to claim 1, wherein the second thermoplastic polymer is selected from polylactic acid (PLA), polycaprolactone (PCL), polybutylene adipate terephthalate (PBAT), polyhydroxyalkanoate (PHA), polybutylene succinate (PBS), polybutylene succinate adipate (PBSA), polybutylene adipate (PBA), polyglycolic acid (PGA), ethylene-vinyl acetate (EVA), polydioxanone (PDS), polyethylene glycol (PEG), PEG with molecular mass above 600 g/mol, polyethylene oxide (PEO) and copolymers and derivatives thereof.

5. The multicomponent plastic product according to claim 1, wherein the first thermoplastic polymer is selected from polyolefins, aliphatic and semi-aromatic polyesters, polyamides, polyurethanes, vinyl polymers, polyethers or ester-ether copolymers and derivatives thereof.

6. The multicomponent plastic product according to claim 1, wherein the first thermoplastic polymer is selected from aliphatic and semi-aromatic polyesters and polyamides.

7. The multicomponent plastic product according to claim 1, wherein the first thermoplastic material/second thermoplastic material weight ratio is 50/50 to 99/1.

8. The multicomponent plastic product according to claim 1, wherein said multicomponent product is selected from multicomponent filament or a multilayer plastic product.

9. The multicomponent plastic product according to claim 1, wherein said multicomponent product is a multicomponent filament, wherein the first and second thermoplastic materials are arranged in the form of a sheath/core, tipped tri-lobal fiber, bicomponent tri-lobal, side-by-side, islands in the sea or segmented pie.

10. The multicomponent plastic product according to claim 1, wherein said multicomponent product is a multicomponent filament wherein the first thermoplastic material is a sheath made with the first thermoplastic polymer and the second thermoplastic material is a core made of the second thermoplastic polymer and degrading enzyme.

11. The multicomponent plastic product according to claim 9, wherein said multicomponent product is a multicomponent filament wherein the first thermoplastic material comprises PLA and the second thermoplastic material comprises PCL and a PLA-degrading enzyme.

12. The multicomponent plastic product according to claim 9, wherein said multicomponent product is a multicomponent filament wherein the first thermoplastic material comprises PET or copolymers thereof and the second thermoplastic material comprises PCL and a PET-degrading enzyme.

13. The multicomponent plastic product according to claim 1, wherein said multicomponent product is selected from multilayer plastic films, multilayer plastic sheets, multilayer plastic trays, multilayer plastic bottles, multilayer packaging, multilayer profiles and tubes.

14. A process for manufacturing a multicomponent plastic product comprising the steps:
   a) selecting a first thermoplastic material comprising a first thermoplastic polymer;
   b) selecting a degrading enzyme able to degrade the first thermoplastic polymer, wherein the degrading enzyme is not a drug;
   c) mixing the degrading enzyme with a second thermoplastic polymer at a temperature at which said second thermoplastic polymer is in a partially or totally molten state, wherein the second thermoplastic polymer is water-insoluble, to obtain a second thermoplastic material, wherein the second thermoplastic material has a transformation temperature (Tf) at least 50° C. lower than the transformation temperature (Tf) of the first thermoplastic material; and
   d) coextruding or coinjecting or extruding coating said thermoplastic materials to obtain a multicomponent product.

15. The process according to claim 14, wherein the multicomponent plastic product is a multicomponent filament produced by coextruding said thermoplastic materials.

16. The process according to claim 14, wherein the step of coextruding is performed within a coextruder with a coextrusion die selected from sheet die, flat-film die, pipe or tubing die, profile extrusion die.

17. The process according to claim 14, wherein the degrading enzyme is mixed with the second thermoplastic polymer in an amount between 0.001 and 30% by weight, based on the total weight of the second thermoplastic material.

18. A process of manufacturing a multicomponent product comprising the steps:
   a) selecting a first plastic material comprising a first thermoplastic polymer;
   b) selecting a degrading enzyme able to degrade the first thermoplastic polymer, wherein the degrading enzyme is not a drug;
   c) mixing the degrading enzyme with a second thermoplastic polymer at a temperature at which said second thermoplastic polymer is in a partially or totally molten state, wherein the second thermoplastic polymer is water-insoluble, to obtain a second plastic material; and
   d) processing said thermoplastic materials to obtain a multicomponent product, at processing temperatures wherein said materials are in partially or totally molten state and wherein the processing temperature for the second plastic material at least 50° C. is lower than the processing temperature of the first thermoplastic material.

19. The multicomponent plastic product according to claim 1, wherein the first thermoplastic material/second thermoplastic material weight ratio is 60/40 to 98/2.

20. The multicomponent plastic product according to claim 1, wherein the first thermoplastic material/second thermoplastic material weight ratio is 70/30 to 95/5.

\* \* \* \* \*